United States Patent
Dimas et al.

(10) Patent No.: US 7,189,327 B2
(45) Date of Patent: Mar. 13, 2007

(54) USE OF ANIONIC COPOLYMERS FOR ENHANCED RECOVERY OF USEFUL COAL AND POTASSIUM CHLORIDE FROM SCREEN BOWL CENTRIFUGE

(75) Inventors: Peter A. Dimas, Wheaton, IL (US); Kenneth M. McGough, Charleston, WV (US)

(73) Assignee: Nalco Company, Naperville, IL (US)

( * ) Notice: Subject to any disclaimer, the term of this patent is extended or adjusted under 35 U.S.C. 154(b) by 38 days.

(21) Appl. No.: 10/853,840

(22) Filed: May 26, 2004

(65) Prior Publication Data

US 2005/0224421 A1    Oct. 13, 2005

Related U.S. Application Data

(63) Continuation-in-part of application No. 10/820,552, filed on Apr. 8, 2004.

(51) Int. Cl.
*C02F 1/56* (2006.01)
*B01D 37/03* (2006.01)

(52) U.S. Cl. ............... 210/709; 44/626; 209/5; 210/734; 210/738; 423/499.1

(58) Field of Classification Search ............ 210/734
See application file for complete search history.

(56) References Cited

U.S. PATENT DOCUMENTS

| | | | |
|---|---|---|---|
| 3,617,572 A * | 11/1971 | Monagle | 210/734 |
| 4,021,206 A * | 5/1977 | Huberts et al. | 44/620 |
| 4,437,861 A * | 3/1984 | Ishizuka et al. | 44/627 |
| 4,477,353 A * | 10/1984 | Messer | 210/633 |
| 4,634,536 A * | 1/1987 | Grimwood et al. | 210/781 |
| 4,906,386 A * | 3/1990 | Vasconcellos et al. | 210/727 |
| 5,089,142 A * | 2/1992 | Turunc | 210/728 |
| 5,093,413 A | 3/1992 | Bhattacharyya et al. | 524/801 |
| 5,529,588 A * | 6/1996 | Sommese et al. | 44/626 |
| 5,779,910 A * | 7/1998 | Donlin | 210/726 |
| 6,440,316 B1 * | 8/2002 | Yoon et al. | 210/770 |
| 6,544,425 B2 * | 4/2003 | Miller | 210/710 |
| 6,627,719 B2 | 9/2003 | Whipple et al. | 526/319 |
| 7,087,174 B2 * | 8/2006 | Dimas et al. | 210/709 |

OTHER PUBLICATIONS

Perucca, C.F., "Potash processing in Saskatchewan—A review of process technologies", *CIM*, pp. 61-65, Apr. 2003.

* cited by examiner

*Primary Examiner*—Peter A. Hruskoci
(74) *Attorney, Agent, or Firm*—Peter A. DiMattia; Michael B. Martin; Thomas M. Breininger

(57) ABSTRACT

A method of enhancing the recovery of useful coal or potassium chloride from screenbowl centrifuge separation operations comprising adding to the screenbowl centrifuge, from about 0.005 lbs active polymer/ton dry solids in centrifuge to about 0.70 lbs active polymer/ton dry solids in centrifuge, of an anionic copolymer, wherein said anionic copolymer is selected from the group comprising copolymers of acrylamide and acrylic acid and the known salts thereof.

4 Claims, No Drawings

USE OF ANIONIC COPOLYMERS FOR ENHANCED RECOVERY OF USEFUL COAL AND POTASSIUM CHLORIDE FROM SCREEN BOWL CENTRIFUGE

CROSS-REFERENCE TO RELATED PATENT APPLICATION

This patent application is a continuation-in-part of U.S. patent application Ser. No. 10/820,552, which was filed on Apr. 8, 2004 and is now pending.

FIELD OF THE INVENTION

This invention is in the field of mining and processing of coal and potassium chloride. More particularly this invention concerns the use of anionic copolymers to enhance recovery of useful coal and potassium chloride in screen bowl centrifuge separation operations.

BACKGROUND OF THE INVENTION

In processing of coal and potassium chloride it is typical to use a one or more solid-liquid separation stages in order to isolate the desired solids. In all of these mining processing applications, the finest fractions of solid-liquid slurries may be subjected to screen bowl centrifugation for recovery of dewatered solids. The screenbowl centrifuge in a coal or potassium chloride processing plant is used to remove the moisture from the coal or potassium chloride. As part of the moisture removal some of the solids, usually about –40 microns in size, are lost.

The screenbowl centrifuge rotates at a very high rpm. The slurry of coal or potassium chloride enters through the feed pipe and discharges inside the machine. The solids accelerate to the high rpm portion of the machine and thus encounter high centrifugal forces. This causes the solids to move to the outside of machine and the solids are then moved toward the discharge by an auger. The liquid moves in the opposite direction and discharges as "effluent" at the "bowl drain". The effluent is typically sent to waste and thus the useful coal or potassium chloride in the effluent is lost. That is the waste that mining processing is trying to reduce. A small fraction of the liquid leaves the centrifuge at the screen drain, however, that is not the fraction of interest in this work because the amount of screen drain liquid is relatively small compared to the effluent and the screen drain liquid typically is recycled back through the process.

The separation inside the machine is made at about 40 microns; greater than about 98% of the +40 micron material reports to the discharge as product along with about 50–70% of the –40 micron material. The remaining about 30–50% of the –40 micron solids report to the effluent and are discarded.

In these separations, it is always a goal to increase the amount of useful coal and potassium chloride that is recovered.

In the past when flocculants were added to the feed prior to entering the machine, the high centrifugal forces inside the machine resulted in the flocculants being sheared, and thus they were not effective in capturing more solids. Therefore, it is widely accepted in the industry that flocculent addition is not effective in reducing the amount of solids being discharged in the effluent.

It would be desirable to identify materials capable of flocculating coal and potassium chloride within the high shear conditions of a centrifuge separation.

SUMMARY OF THE INVENTION

The first aspect of the instant claimed invention is a method of enhancing the recovery of useful coal from screenbowl centrifuge separation operations comprising adding to the screenbowl centrifuge, from about 0.005 lbs active polymer/ton dry solids in centrifuge to about 0.70 lbs active polymer/ton dry solids in centrifuge, of an anionic copolymer, wherein said anionic copolymer is selected from the group comprising copolymers of acrylamide and acrylic acid and known salts thereof.

The second aspect of the instant claimed invention is a method of enhancing the recovery of useful potassium chloride from screenbowl centrifuge separation operations comprising adding to the screenbowl centrifuge, from about 0.005 lbs active polymer/ton dry solids in centrifuge to about 0.70 lbs active polymer/ton dry solids in centrifuge, of an anionic copolymer to the screenbowl centrifuge, wherein said anionic copolymer is selected from the group comprising copolymers of acrylamide and acrylic acid and known salts thereof.

DETAILED DESCRIPTION OF THE INVENTION

Throughout this patent application, the following terms have the indicated meanings.

"AA" means acrylic acid, and its salts, including, but not limited to sodium acrylate, and ammonium acrylate, "Ac/Am" means acrylamide.

"Based on polymer active" and "based on monomer" mean the amount of a reagent added based on the level of vinylic monomer in the formula, or the level of polymer formed after polymerization, assuming 100% conversion.

"Based on formula" means the amount of reagent added based on the total formula weight.

"Chain Transfer Agent' means any molecule, used in free-radical polymerization, which will react with a polymer radical forming a dead polymer and a new radical. Representative Chain Transfer Agents are listed by K. C. Berger and G. Brandrup, "Transfer Constants to Monomer, Polymer, Catalyst, Solvent, and Additive in Free Radical Polymerization," Section II, pp. 81–151, in "Polymer Handbook," edited by J. Brandrup and E. H. Immergut, 3d edition, 1989, John Wiley & Sons, New York. Preferred chain transfer agents include sodium formate, 2-mercaptoethanol and isopropanol. Sodium formate is more preferred.

"Coal" means a natural, solid, combustible material formed from prehistoric plant life which occurs in layers or veins in sedimentary rocks. Chemically, coal is a macromolecular network composed of groups of polynuclear aromatic rings, to which are attached subordinate rings connected to oxygen, sulfur and aliphatic bridges.

"Dispersion polymer" means a dispersion of fine particles of polymer in an aqueous salt solution which is prepared by polymerizing monomers with stirring in an aqueous salt solution in which the resulting polymer is insoluble. See U.S. Pat. Nos. 5,708,071; 4,929,655; 5,006,590; 5,597,859; 5,597,858 and European Patent nos. 657,478 and 630,909.

In a typical procedure for preparing a dispersion polymer, an aqueous solution containing one or more inorganic or hydrophobic salts, one or more water-soluble monomers, any polymerization additives such as processing aids, chelants, pH buffers and a water-soluble stabilizer polymer is charged to a reactor equipped with a mixer, a thermocouple, a nitrogen purging tube, and a water condenser. The monomer solution is mixed vigorously, heated to the desired temperature, and then a water-soluble initiator is added. The solution is purged with nitrogen while maintaining temperature and mixing for several hours. After this time, the mixture is cooled to room temperature, and any post-polymerization additives are charged to the reactor. Water continuous dispersions of water-soluble polymers are free flowing liquids with product viscosities generally 100–10,000 cP, measured at low shear.

"Gel polymer" means a polymer made by gel polymerization. In a typical procedure for preparing gel polymers, an aqueous solution containing one or more water-soluble monomers and any additional polymerization additives such as chelants, pH buffers, and the like, is prepared. This mixture is charged to a reactor equipped with a mixer, a thermocouple, a nitrogen purging tube and a water condenser. The solution is mixed vigorously, heated to the desired temperature, and then one or more water-soluble free radical polymerization initiators are added. The solution is purged with nitrogen while maintaining temperature and mixing for several hours. Typically, the viscosity of the solution increases during this period. After the polymerization is complete, the reactor contents are cooled to room temperature and then transferred to storage. Gel polymer viscosities vary widely, and are dependent upon the concentration and molecular weight of the active polymer component. Gel polymers may be dried to yield dry polymers.

"Latex polymer" means a water-in-oil polymer emulsion comprising an anionic copolymer according to this invention in the aqueous phase, a hydrocarbon oil for the oil phase and one or more water-in-oil emulsifying agents. Latex polymers are hydrocarbon continuous with the water-soluble polymers dispersed within the hydrocarbon matrix. The latex polymer is "inverted" or activated for use by releasing the polymer from the particles using shear, dilution, and, generally, another surfactant. See U.S. Pat. No. 3,734,873, incorporated herein by reference. Representative preparations of high molecular weight inverse emulsion polymers are described in U.S. Pat. Nos. 2,982,749; 3,284,393; and 3,734,873. See also, "Mechanism, Kinetics and Modeling of the Inverse-Microsuspension Homopolymerization of Acrylamide," Hunkeler, et al., Polymer (1989), 30(1), 127–42; and "Mechanism, Kinetics and Modeling of Inverse-Microsuspension Polymerization: 2. Copolymerization of Acrylamide with Quaternary Ammonium Cationic Monomers," Hunkeler et al., Polymer (1991), 32(14), 2626–40.

Inverse emulsion polymers are prepared by dissolving the desired monomers and any polymerization additives such as inorganic salts, chelants, pH buffers, and the like in the aqueous phase, dissolving the emulsifying agent(s) in the oil phase, emulsifying the water phase in the oil phase to prepare a water-in-oil emulsion, in some cases, homogenizing the water-in-oil emulsion, polymerizing the monomers dissolved in the water phase of the water-in-oil emulsion to obtain the polymer as a water-in-oil emulsion. If so desired, a self-inverting surfactant can be added after the polymerization is complete in order to obtain the water-in-oil self-inverting emulsion.

The oil phase comprises any inert hydrophobic liquid. Preferred hydrophobic liquids include aliphatic and aromatic hydrocarbon liquids including benzene, xylene, toluene, paraffin oil, coal, potassium chloride or borax spirits, kerosene, naphtha, and the like. A paraffinic oil is preferred.

Free radical yielding initiators such as benzoyl peroxide, lauroyl peroxide, 2,2'-azobis (isobutyronitrile) (AIBN), 2,2'-azobis(2,4-dimethylvaleronitrile) (AIVN), potassium persulfate and the like are useful in polymerizing vinyl and acrylic monomers. 2,2'-azobis(isobutyronitrile) (AIBN) and 2,2'-azobis(2,4-dimethylvaleronitrile) (AIVN) are preferred. The initiator is utilized in amounts ranging between about 0.002 and about 0.2 percent by weight of the monomers, depending upon the solubility of the initiator.

Water-in-oil emulsifying agents useful for preparing latex polymers include sorbitan esters of fatty acids, ethoxylated sorbitan esters of fatty acids, and the like or mixtures thereof. Preferred emulsifying agents include sorbitan monooleate, polyoxyethylene sorbitan monostearate, and the like. Additional details on these agents may be found in McCutcheon's Detergents and Emulsifiers, North American Edition, 1980. Any inverting surfactant or inverting surfactant mixture described in the prior art may be used. Representative inverting surfactants include ethoxylated nonylphenol, ethoxylated linear alcohols, and the like. Preferred inverting surfactants are ethoxylated linear alcohols.

The polymer is selected from the group comprising polymerizing the appropriate monomers at a temperature of from about 30° C. to about 85° C. over about 1 to about 24 hours, preferably at a temperature of from about 40° C. to about 70° C. over about 3 to about 6 hours. Upon completion of the reaction, the water-in-oil emulsion polymer is cooled to room temperature, where any desired post-polymerization additives, such as antioxidants, or a high HLB surfactant (as described in U.S. Pat. No. 3,734,873) may be added.

The resulting emulsion polymer is a free-flowing liquid. An aqueous solution of the water-in-oil emulsion polymer can be generated by adding a desired amount of the emulsion polymer to water with vigorous mixing in the presence of a high-HLB surfactant (as described in U.S. Pat. No. 3,734,873).

"lbs" means pounds. One pound is equal to 454 grams is equal 0.454 kilograms

"Nalco" means Nalco Company, 1601 W. Diehl Road, Naperville, Ill. 60563. (630) 305–1000.

"potassium chloride" is KCl, Chemical Abstract Services Registry No. 7447-40-7. For purposes of this patent application the word "Potash" is understood to be a source of potassium chloride. Potash is currently being mined in New Mexico, U.S.A. and in Saskatchewan, Canada.

"RSV" stands for Reduced Specific Viscosity. The RSV of a polymer solution is a measure of the capacity of polymer molecules to enhance the viscosity of the solution at a given concentration, which depends on the structure of the polymer molecules (including size and shape), and interaction between polymer molecules. Within a series of polymer homologs which are substantially linear and well solvated, "reduced specific viscosity (RSV)" measurements for dilute polymer solutions are an indication of polymer chain length and average molecular weight according to Paul J. Flory, in "Principles of Polymer Chemistry", Cornell University Press, Ithaca, N.Y., 1953, Chapter VII, "Determination of Molecular Weights", pp. 266–316. The RSV is measured at a given polymer concentration and temperature and calculated as follows:

$$RSV = \frac{\left[\left(\frac{\eta}{\eta_o}\right) - 1\right]}{c}$$

wherein $\eta$=viscosity of polymer solution;
$\eta_o$=viscosity of solvent at the same temperature; and
c=concentration of polymer in solution.

The units of concentration "c" are (grams/100 ml or g/deciliter). Therefore, the units of RSV are dL/g. In this patent application, for measuring RSV, the solvent used is 1.0 molar sodium nitrate solution. The polymer concentration in this solvent is 0.045 g/dL as acid. The RSV is measured at 30° C. The viscosities $\eta$ and $\eta_o$ are measured using a Cannon Ubbelohde semimicro dilution viscometer, size 75. The viscometer is mounted in a perfectly vertical position in a constant temperature bath adjusted to 30±0.02° C. The error inherent in the calculation of RSV is about 2 dl/grams. When two polymer homologs within a series have similar RSV's that is an indication that they have similar molecular weights.

"ton" means 2000 pounds.

The instant claimed invention is a method of enhancing the recovery of useful mined materials from screenbowl centrifuge separation operations comprising adding to the screenbowl centrifuge, from about 0.005 lbs active polymer/ton dry solids in centrifuge to about 0.70 lbs active polymer/ton dry solids in centrifuge, of an anionic copolymer, wherein said anionic copolymer is selected from the group comprising copolymers of acrylamide and acrylic acid and known salts thereof.

The useful mined materials are selected from the group consisting of coal and potassium chloride.

The screenbowl centrifuge separation operations can be any part of the coal or potassium chloride where a screenbowl centrifuge is used in the separation. For instance, in coal processing, typically the screenbowl centrifuge in a coal processing plant is used to remove the moisture from the coal, prior to the finished coal leaving the coal processing plant.

The streams associated with a screenbowl include the feed, the effluent, the screen drain and the product.

"Feed" is the minus 1 mm material at 25–35% solids that enters the screenbowl. The flow varies from about 350 to about 800 gallons per minute depending on the size of the machine. The percent solids can vary from about 20% to about 40% and the tons per hour of solids can be from about 20 to about 80.

"Effluent" is the water and fine solids that are removed from the coal. The solids in the effluent are usually 96–98% minus 40 microns. The flow can be 250–500 gpm and the tons/hr of solids depends upon the % solids. This material normally reports to the refuse thickener for disposal. This is the material that the instant claimed invention is directed to as the instant claimed invention will permit more useful coal or potassium chloride to leave the screen bowl centrifuge with the product instead of leaving the screen bowl centrifuge with the effluent.

"Screen Drain" is entrained water and fine solids that are removed just prior to the coal discharging the machine. The flow is usually small, about 5% of the feed flow, and this material is recycled back into the plant.

"Product" is the dried coal or the dried potassium chloride to be sold.

The screenbowl rotates at a very high rpm. The coal slurry enters through the feed pipe and discharges inside the machine. The solids accelerate to the high rpm of the machine and thus encounter high centrifugal forces. This causes the solids to move to the outside of machine and the solids are then moved toward the discharge by an auger. The liquid moves in the opposite direction and discharges at the feed end. The separation inside the machine is made at about 40 microns; greater than 98% of the +40 micron material reports to the discharge as product along with about 50–60% of the −40 micron material. The remaining 40–50% of the −40 micron solids report to the effluent and are discarded.

The anionic copolymers are added to the screenbowl for the purpose of capturing more of the solids from the effluent and thus having the solids report with the Product. In the past when flocculants were added to the feed prior to entering the machine, the high forces inside the machine resulted in the flocculants being sheared, and thus they were not effective in capturing more solids. Therefore, it was widely accepted in the industry that any type of flocculant addition was not effective in reducing the amount of solids being discharged in the effluent. In contrast to what was believed to be true, with use of the anionic copolymers described herein, it has been found possible to enhance the recovery of desired coal or potassium chloride by using the anionic copolymers in centrifuge separation operations.

The anionic copolymers can be made by latex polymerization, gel polymerization and dispersion polymerization techniques. It is preferred that they be made by latex polymerization, for convenience of application, and thus latex polymers are preferred for use in the instant claimed invention.

Regarding the polymers, the anionic copolymers useful in the instant claimed invention are selected from the group comprising copolymers of acrylamide and acrylic acid and known salts thereof.

In one preferred aspect, the anionic copolymer is selected from the group comprising copolymers of acrylamide and acrylic acid and known salts thereof, wherein the amount of acrylic acid present is about 30 mol percent.

In another preferred aspect, the anionic copolymer is a copolymer of acrylamide and acrylic acid and known salts thereof wherein at least from about 10 ppm sodium formate to about 1000 ppm sodium formate had been added to the reaction mixture. The sodium formate may be added to the monomer phase or may be added later in the reaction.

The anionic copolymers useful in the instant claimed invention are either available commercially from Nalco or they may be synthesized using techniques known to people of ordinary skill in the art.

The total amount of polymer required to effectively enhance the recovery of useful coal or potassium chloride from centrifuge separation may vary considerably according to the characteristics of the material being fed into the screenbowl centrifuge and the degree of processing in the centrifuge required.

Typically, the polymer is added in an amount of from about 0.005 lbs active polymer/ton dry solids in centrifuge to about 0.70 lbs active polymer/ton dry solids in centrifuge, preferably from about 0.01 lbs active polymer/ton dry solids into centrifuge to about 0.68 lbs active polymer/ton dry solids in centrifuge, and more preferably from about 0.1 lbs active polymer/ton dry solids in centrifuge to about 0.3 lbs active polymer/ton dry solids into centrifuge based on polymer actives.

The dose of polymer based on lbs active polymer/lbs slurry in centrifuge, expressed in ppm, is as follows: the polymer is added in an amount of from about 1 ppm to about 140 ppm, preferably from about 1.5 ppm to about 136 ppm and more preferably from about 15 ppm to about 45 ppm based on polymer actives.

To enhance the efficacy of the anionic copolymers of the instant claimed invention it is recommended to add the polymers inside the centrifuge in a low-shear zone to allow the solids to be flocculated without being torn apart by the shear forces. Preferably, the polymers are added after water and fine sized solids were separated from the larger coal particle. It is not recommended to add the polymers with the feed into the screenbowl centrifuge because if this is done, then any positive effect the polymers have upon the feed in terms of flocculation will be negated when the newly formed flocs encounter the severe shear in the centrifuge.

Addition of polymer to centrifuge may be through pipes or drop chutes or any other technique known in the art.

In addition to enhancing the recovery of coal, use of the anionic copolymers of this invention has also been found possible to enhance the recovery of potassium chloride.

The second aspect of the instant claimed invention is a method of enhancing the recovery of useful potassium chloride from screenbowl centrifuge separation operations comprising adding to the screenbowl centrifuge, from about 0.005 lbs active polymer/ton dry solids in centrifuge to about 0.70 lbs active polymer/ton dry solids in centrifuge, of an anionic copolymer, wherein said anionic copolymer is selected from the group comprising copolymers of acrylamide and acrylic acid and known salts thereof.

Potassium chloride is mined from sylvite deposits, known as Potash, in New Mexico and Saskatchewan and purified by fractional crystallization or flotation. It can also be crystallized from salt lake brine and purified by recrystallization. A thorough review article of processing of potash in the mines of Saskatchewan can be found in CIM Bulletin, Vol. 96, No. 1070, pgs. 61–65, "Potash Processing in Saskatchewan—A review of process technologies" by C. F. Perucca, April 2003.

When potash is being processed to yield potassium chloride, screen-bowl centrifuges are used to de-brine the concentrates from flotation bearing the valuable coal or potassium chloride. The concentrate is then dried and compacted to afford granular product for fertilizer applications or is redissolved and crystallized to afford industrial grade potassium chloride.

The performance of the anionic copolymers of this invention may be monitored by means of an inert fluorescent tracer as described in U.S. Pat. No. 4,783,314, incorporated herein by reference. In particular, a composition comprising an anionic copolymer according to this invention and an inert fluorescent tracer compound in a known ratio is added to the screenbowl centrifuge containing the coal or potassium chloride slurry as described above. The fluorescent signal of the coal or potassium chloride slurry is detected and measured using one or more fluorometers and used to quantify and control the amount and feed rate of the polymer to achieve the desired amount of anionic copolymer in the coal or potassium chloride slurry.

"Inert fluorescent tracer compound" means a material which is capable of fluorescing while present in the sludge being treated. The inert fluorescent tracer compound should not be appreciably affected by any other material present in the coal or potassium chloride slurry, or by the temperature or temperature changes encountered during the dewatering process. Inert fluorescent tracers suitable for use with the anionic copolymers of the instant claimed invention are selected from the group comprising:

1-deoxy-1-(3,4-dihydro-7,8-dimethyl-2,4-dioxobenzo[g] pteridin-10(2H)-yl)-D-ribitol, also known as Riboflavin or Vitamin B2 (CAS Registry No. 83-88-5),
fluorescein (CAS Registry No. 2321-07-5),
fluorescein, sodium salt (CAS Registry No. 518-47-8, aka Acid Yellow 73, Uranine),
2-anthracenesulfonic acid sodium salt (CAS Registry No. 16106-40-4),
1,5-anthracenedisulfonic acid (CAS Registry No. 61736-91-2) and salts thereof,
2,6-anthracenedisulfonic acid (CAS Registry No. 61736-95-6) and salts thereof,
1,8-anthracenedisulfonic acid (CAS Registry No. 61736-92-3) and salts thereof,
mono-, di-, or tri-sulfonated napthalenes, including but not limited to
   1,5-naphthalenedisulfonic acid, disodium salt (hydrate) (CAS Registry No. 1655-29-4, aka 1,5-NDSA hydrate),
   2-amino-1-naphthalenesulfonic acid (CAS Registry No. 81-16-3),
   5-amino-2-naphthalenesulfonic acid (CAS Registry No. 119-79-9),
   4-amino-3-hydroxy-1-naphthalenesulfonic acid (CAS Registry No. 90-51-7),
   6-amino-4-hydroxy-2-naphthalenesulfonic acid (CAS Registry No. 116-63-2),
   7-amino-1,3-naphthalenesulfonic acid, potassium salt (CAS Registry No. 79873-35-1),
   4-amino-5-hydroxy-2,7-naphthalenedisulfonic acid (CAS Registry No. 90-20-0),
   5-dimethylamino-1-naphthalenesulfonic acid (CAS Registry No. 4272-77-9),
   1-amino-4-naphthalene sulfonic acid (CAS Registry No. 84-86-6),
   1-amino-7-naphthalene sulfonic acid (CAS Registry No. 119-28-8), and
   2,6-naphthalenedicarboxylic acid, dipotassium salt (CAS Registry No. 2666-06-0),
3,4,9,10-perylenetetracarboxylic acid (CAS Registry No. 81-32-3),
C.I. Fluorescent Brightener 191, also known as, Phorwite CL (CAS Registry No. 12270-53-0),
C.I. Fluorescent Brightener 200, also known as Phorwite BKL (CAS Registry No. 61968-72-7),
benzenesulfonic acid, 2,2'-(1,2-ethenediyl)bis[5-(4-phenyl-2H-1,2,3-triazol-2-yl)-, dipotassium salt, also known as Phorwite BHC 766 (CAS Registry No. 52237-03-3),
benzenesulfonic acid, 5-(2H-naphtho[1,2-d]triazol-2-yl)-2-(2-phenylethenyl)-, sodium salt, also known as Pylaklor White S-15A (CAS Registry No. 6416-68-8),
1,3,6,8-pyrenetetrasulfonic acid, tetrasodium salt (CAS Registry No. 59572-10-0),
pyranine, (CAS Registry No. 6358-69-6, aka 8-hydroxy-1,3,6-pyrenetrisulfonic acid, trisodium salt),
quinoline (CAS Registry No. 91-22-5),
3H-phenoxazin-3-one, 7-hydroxy-, 10-oxide, also known as Rhodalux (CAS Registry No. 550-82-3),
xanthylium, 9-(2,4-dicarboxyphenyl)-3,6-bis(diethylamino)-, chloride, disodium salt, also known as Rhodamine WT (CAS Registry No. 37299-86-8),
phenazinium, 3,7-diamino-2,8-dimethyl-5-phenyl-, chloride, also known as Safranine O (CAS Registry No. 477-73-6),
C.I. Fluorescent Brightener 235, also known as Sandoz CW (CAS Registry No. 56509-06-9),
benzenesulfonic acid, 2,2'-(1,2-ethenediyl)bis[5-[[4-[bis(2-hydroxyethyl)amino]-6-[(4-sulfophenyl)amino]-1,3,5-triazin-2-yl]amino]-, tetrasodium salt, also known as Sandoz CD (CAS Registry No. 16470-24-9, aka Flu. Bright. 220),
benzenesulfonic acid, 2,2'-(1,2-ethenediyl)bis[5-[[4-[(2-hydroxypropyl)amino]-6-(phenylamino)-1,3,5-triazin-2-yl] amino]-, disodium salt, also known as Sandoz TH-40 (CAS Registry No. 32694-95-4),
xanthylium, 3,6-bis(diethylamino)-9-(2,4-disulfophenyl)-, inner salt, sodium salt, also known as Sulforhodamine B (CAS Registry No. 3520-42-1, aka Acid Red 52), benzenesulfonic acid, 2,2'-(1,2-ethenediyl)bis[5-[[4-[(aminomethyl)(2-hydroxyethyl)amino]-6-(phenylamino)-1,3,5-triazin-2-yl]amino]-, disodium salt, also known as Tinopal 5BM-GX (CAS Registry No. 169762-28-1), Tinopol DCS (CAS Registry No. 205265-33-4), benzenesulfonic acid, 2,2'-([1,1'-biphenyl]-4,4'-diyldi-2,1-ethenediyl)bis-, disodium salt, also known as Tinopal CBS-X (CAS Registry No. 27344-41-8), benzenesulfonic acid, 5-(2H-naphtho[1,2-d]triazol-2-yl)-2-(2-phenylethenyl)-, sodium salt, also known as Tinopal RBS 200, (CAS Registry No. 6416-68-8), 7-benzothiazolesulfonic acid, 2,2'-(1-triazene-1,3-diyldi-4,1-phenylene)bis[6-methyl-, disodium salt, also known as Titan Yellow (CAS Registry No. 1829-00-1, aka Thiazole Yellow G), and all ammonium, potassium and sodium salts thereof, and all like agents and suitable mixtures thereof.

The more preferred fluorescent inert tracers of the present invention include 1,3,6,8-pyrenetetrasulfonic acid tetrasodium salt (CAS Registry No. 59572-10-0); 1,5-naphthalenedisulfonic acid disodium salt (hydrate) (CAS Registry No. 1655-29-4, aka 1,5-NDSA hydrate); xanthylium, 9-(2,4-dicarboxyphenyl)-3,6-bis(diethylamino)-, chloride, disodium salt, also known as Rhodamine WT (CAS Registry No. 37299-86-8); 1-deoxy-1-(3,4-dihydro-7,8-dimethyl-2,4-dioxobenzo[g]pteridin-10(2H)-yl)-D- ribitol, also known as Riboflavin or Vitamin B2 (CAS Registry No. 83-88-5); fluorescein (CAS Registry No. 2321-07-5); fluorescein, sodium salt (CAS Registry No. 518-47-8, aka Acid Yellow 73, Uranine); 2-anthracenesulfonic acid sodium salt (CAS Registry No. 16106-40-4); 1,5-anthracenedisulfonic acid (CAS Registry No. 61736-91-2) and salts thereof; 2,6-anthracenedisulfonic acid (CAS Registry No. 61736-95-6) and salts thereof; 1,8-anthracenedisulfonic acid (CAS Registry No. 61736-92-3) and salts thereof; and mixtures thereof. The fluorescent tracers listed above are commercially available from a variety of different chemical supply companies.

The most preferred inert fluorescent tracer compound is 1,3,6,8-pyrenetetrasulfonic acid, sodium salt.

The anionic copolymer and inert fluorescent tracer compound mixture is prepared by adding the inert fluorescent tracer compound with stirring to the anionic copolymer of this invention. An inverting surfactant as described herein may be added along with the inert fluorescent tracer compound. The amount of inert fluorescent tracer compound added may be readily determined by one of ordinary skill in the art, taking into consideration the polymer composition and the characteristics of the material in the screen bowl centrifuge that is being treated.

One or more fluorometers are used to detect the fluorescent signal of the inert fluorescent tracers. Suitable fluorometers are selected from the group comprising Examples of fluorometers that may be used in the practice of this invention include the TRASAR® 3000 fluorometer, the TRASAR® 8000 fluorometer and the TRASAR® XE-2 Controller, which includes a fluorometer with integrated controller, all available from Nalco; the Hitachi F-4500 fluorometer (available from Hitachi through Hitachi Instruments Inc. of San Jose, Calif.); the JOBIN YVON Fluoro-Max-3 "SPEX" fluorometer (available from JOBIN YVON Inc. of Edison, N.J.); and the Gilford Fluoro-IV spectrophotometer or the SFM 25 (available from Bio-tech Kontron through Research Instruments International of San Diego, Calif.). It should be appreciated that the fluorometer list is not comprehensive and is intended only to show examples of fluorometers. Other commercially available fluorometers and modifications thereof can also be used in this invention.

After the fluorometer has been used to detect the fluorescent signal of the inert fluorescent tracer then the detected fluorescent signal can be converted into the actual concentration of inert fluorescent tracer using graphs that show what the detected fluorescent signal is for a specific amount of a specific inert fluorescent tracer. These graphs are known to people of ordinary skill in the art of fluorometry.

Because the inert fluorescent tracer is added to the screen bowl centrifuge in a known proportion to the anionic copolymer, by detecting the fluorescent signal of the inert fluorescent tracer it is possible to calculate the amount of anionic copolymer present either in the screen bowl centrifuge or in the effluent or even in the screen drain. This enables the operator to determine whether the correct amount of anionic copolymer is present and even to determine where it is present. If desired, adjustments to the operating conditions of the screenbowl centrifuge can be made to ensure the amount of anionic copolymer present is what is supposed to be present.

The following examples are intended to be illustrative of the present invention and to teach one of ordinary skill how to make and use the invention. These examples are not intended to limit the invention or its protection in any way.

EXAMPLES

Example 1

Preparation of a copolymer of acrylamide and ammonium acrylate using no sodium formate and then running the same reaction again with two different levels of sodium formate in the reaction mixture, (not an example of the instant claimed invention)

AcAm/ammonium acrylate (mol ratio of 7:3) inverse emulsion polymers were synthesized in the following manner.

An oil phase was prepared by stirring a mixture of 243 g of paraffinic oil (Conosol C-170), 8.77 g of sorbitan monooleate, and 16.2 g of POE (5) sorbitan monooleate (22° C.).

An aqueous monomer phase was made-up in the following manner. A mixture of 555.08 g of a 49.5% acrylamide solution, 8.05 g water, and 120.04 g of acrylic acid were stirred together in a 1-L beaker and cooled in an ice bath. The ammonium salt of acrylic acid was formed by adding 2.84 g of ammonia gas to the monomer mixture while maintaining the temperature between 10–22° C. Ammonia gas was added until a solution pH of 7.15 was obtained. Versene (EDTA.2 $Na^+$, 0.20 g) and 0.25 g of an 8% solution of tert-butyl hydroperoxide were added to the resulting solution. Sodium formate (none for Polymer 1, 100 ppm for Polymer 2 and 550 ppm for Polymer 3) is added to the aqueous monomer phase.

The oil phase was charged into a 2-L reactor. With vigorous stirring (900 rpm, 10 mm rod with a teflon paddle at the base and 6-blade turbine mounted 3-inches from the bottom), the monomer phase was added over 2 minutes. The resulting mixture was stirred for 30 minutes.

Polymerization is carried out under a $N_2$ atmosphere by feeding a 0.1% solution of sodium bisulfite at a rate of 2.12 mL/hr for the first 90 minutes then at 4.24 mL/hr for 2.5 hrs. The reaction temperature is allowed to increase to and is held at 39° C. during the first hour of the reaction, then is ramped to 45° C. over the remaining 3 hours. At the completion of the reaction, the reaction mixture was cooled to 35° C., and 18 g of Synperonic L24-7 (ethoxylated linear alcohol surfactant available from Huntsman Chemical Company) was added over a period of 15 minutes. An RSV of 30.5 dL/g (450 ppm, 30° C., IM NaNO$_3$) and a bulk viscosity of 642 cPs (#2 spindle/30 rpm) were measured for the resulting polymer.

Polymers 2 and 3 (Table 1) were synthesized in a similar manner except for the level of sodium formate added to the monomer phase.

TABLE 1

70/30 AcAm/ammonium acrylate copolymers containing sodium formate according to Example 1

| Polymer | Level of Sodium Formate (ppm) | RSV (dL/g) | Bulk Viscosity (cPs) |
|---|---|---|---|
| 1 | 0 | 30.5 | 642 |
| 2 | 550 | 33.7 | 680 |
| 3 | 100 | 48.5 | 684 |

Example 2

The screening test for the anionic copolymers in the method of the instant claimed invention is as follows:

A mixture of 40 cc of slurry and anionic copolymer, at the desired dose, is charged into a 50 mL centrifuge tube. The contents of the tube are mixed on a Fisher Vortex Genie 2™ from Fisher Scientific, dialed to 6.5 of 8 for 10 seconds. This vortex mixing is followed by centrifugation, using a Model HN-S centrifuge from International Equipment Company, Needham Heights, Mass., set at Full, which reads as 2700 revolutions per minute on the tach dial for 1 min. After one minute the centrifuge is 'dialed off' and the break is applied. Following centrifugation, the contents of the tube are mixed again for 10 seconds with the same vortex mixer used previously at the same settings, at which time the nature of the floc formed is observed.

In this screening study a coal slurry is used. The anionic copolymers are as follows:

Polymer 1 is an AcAm/ammonium acrylate copolymer (70/30 mol ratio) made with 0 ppm sodium formate, with an RSV of about 30.5 and a bulk viscosity of about 642 cPs.

Polymer 2 is an AcAm/ammonium acrylate copolymer (70/30 mol ratio) made with 550 ppm sodium formate, with an RSV of about 33.7 and a bulk viscosity of about 680 cPs.

Polymer 3 is an AcAm/ammonium acrylate copolymer (70/30 mol ratio) made with 100 ppm sodium formate with an RSV of about 48.5 and a bulk viscosity of about 684 cPs.

Polymer 4 is an AcAm/ammonium acrylate copolymer (70/30 mol ratio) with an RSV of about 33 dL/g .

Polymer 5 is an AcAm/sodium acrylate copolymer (70/30 mol ratio) with an RSV of about 33 dL/g.

Polymer 6 is an AcAm/sodium acrylate copolymer (70/30 mol ratio) with an RSV of about 37 dL/g.

Polymer 7 is an AcAm/sodium acrylate copolymer (70/30 mol ratio) with an RSV of about 35 dL/g.

| Test | Polymer | lbs Prod/ ton coal | lbs act/ ton coal | Observations @ 10 seconds | Additional Observations |
|---|---|---|---|---|---|
| 1 | blank | | 0.000 | brown/grey o/f, disrupted at 6 sec and blackened. | 10 cc solid at 1 min. |
| 2 | 1 | 0.0038 | 0.015 | grey o/f with coal skin; cake intact at 10 sec | o/f got blacker at 30 sec; but 15 cc cake still intact. |
| 3 | 2 | 0.0038 | 0.015 | white cloudy layer with skin; cake intact at 10 sec | o/f blackened at 13 sec; 15 cc cake at 1 min. |
| 4 | 3 | 0.0038 | 0.015 | grey o/f with skin; cake still intact at 10 sec. | o/f darkened at 20 sec, but interface still intact at 1 min. 18 cc solid. |
| 5 | 4 | 0.0038 | 0.016 | (cloudy) white turbid o/f. | Interface dark at 40 sec; 15 cc solid. |
| 6 | 5 | 0.053 | 0.015 | white o/f; not disrupted at 10 sec; intact cake | darker at 35 sec; still intact at 1 min; 15 cc solid. |
| 7 | 6 | 0.045 | 0.016 | white o/f; intact at 10 sec; | black at 25 sec, lost interface; 12 cc solid; |
| 8 | Blank | | 0.000 | Light grey-brown turned dark grey at 6 sec, interface barely visible (more cake disturbance) | O/f is dark grey; interface barely visible at 30 sec. |
| 9 | 7 | | 0.015 | Light grey thru 10 sec of vibration; cake not disturbed | Medium grey by 30 sec of vibration, dark grey at 1 min; cake interface faintly visible; 23 cc cake. |
| 10 | 7 | | 0.045 | very light grey o/f; intact at 10 sec | Blackened at 25 sec; lost interface at 30 s; 15 cc solid |

Note: tests 1 and 8 are not examples of the instant claimed invention.

"o/f" stands for overflow, which is the liquid layer above the solid layer.

"disrupted" means cake enters overflow.

"not disrupted" means cake doesn't enter overflow.

The observations recorded in this table show that the indicated anionic copolymers are effective in flocculating the coal in the slurry under the harsh vibration-centrifugation-vibration conditions of the test.

By using this screening test, it is found that polymers that perform well in high-shear field applications are those that have the ability to form a large floc when mixed on the vortex mixer prior to and following centrifugation.

In a large scale coal processing plant for example, the recovered fine coal is saleable and would afford an additional source of revenue. As an example, a typical coal production plant site can process about 6,000 tons/day through the screen bowl centrifuges. The improvement in effluent solids described here would afford about 150 tons/day, currently saleable at about $15–$30/ton.

Various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

What is claimed is:

1. A method of enhancing the recovery of useful coal from screenbowl centrifuge separation operations comprising
   a) discharging a slurry of coal into the screenbowl centrifuge;
   b) adding to a low shear zone of the screenbowl centrifuge, from about 0.005 lbs active polymer/ton dry solids in centrifuge to about 0.70 lbs active polymer/ton dry solids in centrifuge, of an anionic copolymer, wherein said anionic copolymer is selected from the group consisting of copolymers of acrylamide and acrylic acid and salts thereof to allow solids to be flocculated without being torn apart by shear forces;
   c) centrifuging the slurry to separate the flocculated solids from an effluent; and
   d) recovering useful coal from the slurry.

2. The method of claim 1 wherein an inert fluorescent tracer is added to the anionic copolymer and one or more fluorometers are used to detect the fluorescent signal of the inert fluorescent tracer, which fluorescent signal is used to determine how much inert fluorescent tracer is present and that information is used to determine how much anionic copolymer is present and by knowing how much anionic copolymer is present then if desired, adjustments to the operating conditions of the screenbowl centrifuge can be made to ensure the desired amount of anionic copolymer is present.

3. A method of enhancing the recovery of useful potassium chloride from screenbowl centrifuge separation operations comprising
   a) discharging a slurry of potassium chloride into the screenbowl centrifuge;
   b) adding to a low shear zone of the screenbowl centrifuge, from about 0.005 lbs active polymer/ton dry solids in centrifuge to about 0.70 lbs active polymer/ton dry solids in centrifuge, of an anionic copolymer, wherein said anionic copolymer is selected from the group consisting of copolymers of acrylamide and acrylic acid and salts thereof to allow solids to be flocculated without being torn apart by shear forces;
   c) centrifuging the slurry to separate the flocculated solids from an effluent; and
   d) recovering useful potassium chloride from the slurry.

4. The method of claim 3 wherein an inert fluorescent tracer is added to the anionic copolymer and one or more fluorometers are used to detect the fluorescent signal of the inert fluorescent tracer, which fluorescent signal is used to determine how much inert fluorescent tracer is present and that information is used to determine how much anionic copolymer is present and by knowing how much anionic copolymer is present, then if desired, adjustments to the operating conditions of the screenbowl centrifuge can be made to ensure the desired amount of anionic copolymer is present.

* * * * *